United States Patent
Rathi et al.

(10) Patent No.: US 10,884,741 B2
(45) Date of Patent: *Jan. 5, 2021

(54) PERSISTENT TRANSACTIONAL MEMORY METADATA-BASED BUFFER CACHES

(71) Applicant: Oracle International Corporation, Redwood Shores, CA (US)

(72) Inventors: Unmesh Rathi, Sunnyvale, CA (US); Arjun Sharma, Milpitas, CA (US); Suresh Kumar Neelakanda Iyer, Fremont, CA (US); Vijayan Satyamoorthy Srinivasa, Round Rock, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/536,589

(22) Filed: Aug. 9, 2019

(65) Prior Publication Data

US 2019/0361700 A1    Nov. 28, 2019

Related U.S. Application Data

(63) Continuation of application No. 15/678,007, filed on Aug. 15, 2017, now Pat. No. 10,430,187.

(51) Int. Cl.
*G06F 9/46* (2006.01)
*G06F 9/30* (2018.01)
*G06F 11/14* (2006.01)

(52) U.S. Cl.
CPC .......... *G06F 9/30047* (2013.01); *G06F 9/467* (2013.01); *G06F 11/1446* (2013.01);
(Continued)

(58) Field of Classification Search
None
See application file for complete search history.

(56) References Cited

U.S. PATENT DOCUMENTS 7,644,238 B2 *  1/2010  Carrie ................... G06F 9/3834
                                                             711/147
9,824,134 B2 * 11/2017  Schreter .............. G06F 16/2322
(Continued)

OTHER PUBLICATIONS

Zhang et al, Supporting Multi-row Distributed Transactions with Global Snapshot Isolation Using Bare-bones H Base; IEEE 2010 (Year: 2010).*

*Primary Examiner* — Bing Zhao
(74) *Attorney, Agent, or Firm* — Invoke

(57) ABSTRACT

Techniques for providing high-performance buffer caches for transactional input/output (I/O) systems are disclosed. The techniques include obtaining a first logical creation time of a resource to be acquired by the first transaction during a pre-commit phase of a first transaction with an I/O system. When the first logical creation time exceeds a latest logical creation time from a set of resources previously acquired by the first transaction, the first logical creation time of the resource is compared with an earliest logical termination time from the set of resources. When the first logical creation time of the resource exceeds the earliest logical termination time from the set of resources, a conflict between the resource and the set of resources is detected, and a restart of the first transaction is triggered.

20 Claims, 9 Drawing Sheets

(52) U.S. Cl.
CPC ...... *G06F 11/1474* (2013.01); *G06F 2201/84* (2013.01); *G06F 2201/87* (2013.01)

(56) References Cited

U.S. PATENT DOCUMENTS

| | | |
|---|---|---|
| 2007/0198979 A1 | 8/2007 | Dice et al. |
| 2008/0005332 A1* | 1/2008 | Pande ................... G06F 9/4843 709/226 |
| 2011/0153566 A1 | 6/2011 | Larson et al. |
| 2013/0110883 A1 | 5/2013 | Junqueira et al. |

* cited by examiner

PERSISTENT TRANSACTIONAL MEMORY METADATA-BASED BUFFER CACHES

INCORPORATION BY REFERENCE; DISCLAIMER

The following application is hereby incorporated by reference: application Ser. No. 15/678,007 filed on Aug. 15, 2017. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to software transactional memory. In particular, the present disclosure relates to persistent transactional memory metadata-based buffer caches.

BACKGROUND

With proper hardware support, multi-threading can dramatically increase computational performance. For example, multiple threads may execute on multiple Central Processing Units (CPUs) and/or CPU cores to carry out tasks in parallel for one or more applications. However, as processor performance continues to increase, synchronization between threads or processes occupies a larger fraction of overall execution time. As multi-threaded applications begin to use more threads, this synchronization overhead can become the dominant factor in limiting application performance.

From a software standpoint, synchronization is typically accomplished using locks. A lock is usually acquired before a thread enters a critical section of code, and is released after the thread exits the critical section. If a given thread cannot acquire the lock because a preceding thread has acquired the lock, the thread must wait until the preceding thread releases the lock.

Unfortunately, the process of acquiring a lock and the process of releasing a lock can be very time-consuming in modern microprocessors. They typically involve atomic operations, which flush load and store buffers, and can consequently require hundreds, if not thousands, of processor cycles to complete. Moreover, the number of locks may increase with the number of threads and/or CPU cores used by applications increases, which may increase the likelihood of deadlock and other issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. PERSISTENT TRANSACTIONAL MEMORY METADATA-BASED BUFFER CACHES
4. EXAMPLE EMBODIMENT
5. PROCESSING A READ TRANSACTION IN AN I/O SYSTEM
6. PROCESSING A WRITE TRANSACTIONS IN AN I/O SYSTEM
7. COMPUTER NETWORKS AND CLOUD NETWORKS
8. MISCELLANEOUS; EXTENSIONS
9. HARDWARE OVERVIEW

1. General Overview

Techniques for providing high-performance buffer caches for transactional input/output (I/O) systems are disclosed. The techniques include obtaining a first logical creation time of a first resource to be acquired by the first transaction during a pre-commit phase of a first transaction with an I/O system. When the first logical creation time exceeds a latest logical creation time from a set of resources previously acquired by the first transaction, the first logical creation time of the first resource is compared with an earliest logical termination time from the set of resources. When the first logical creation time of the first resource exceeds the earliest logical termination time from the set of resources, a conflict between the first resource and the set of resources is detected, and a restart of the first transaction is triggered.

One or more embodiments described in this Specification and/or recited in the claims may not be included in this General Overview section.

2. Architectural Overview

Figure 1:
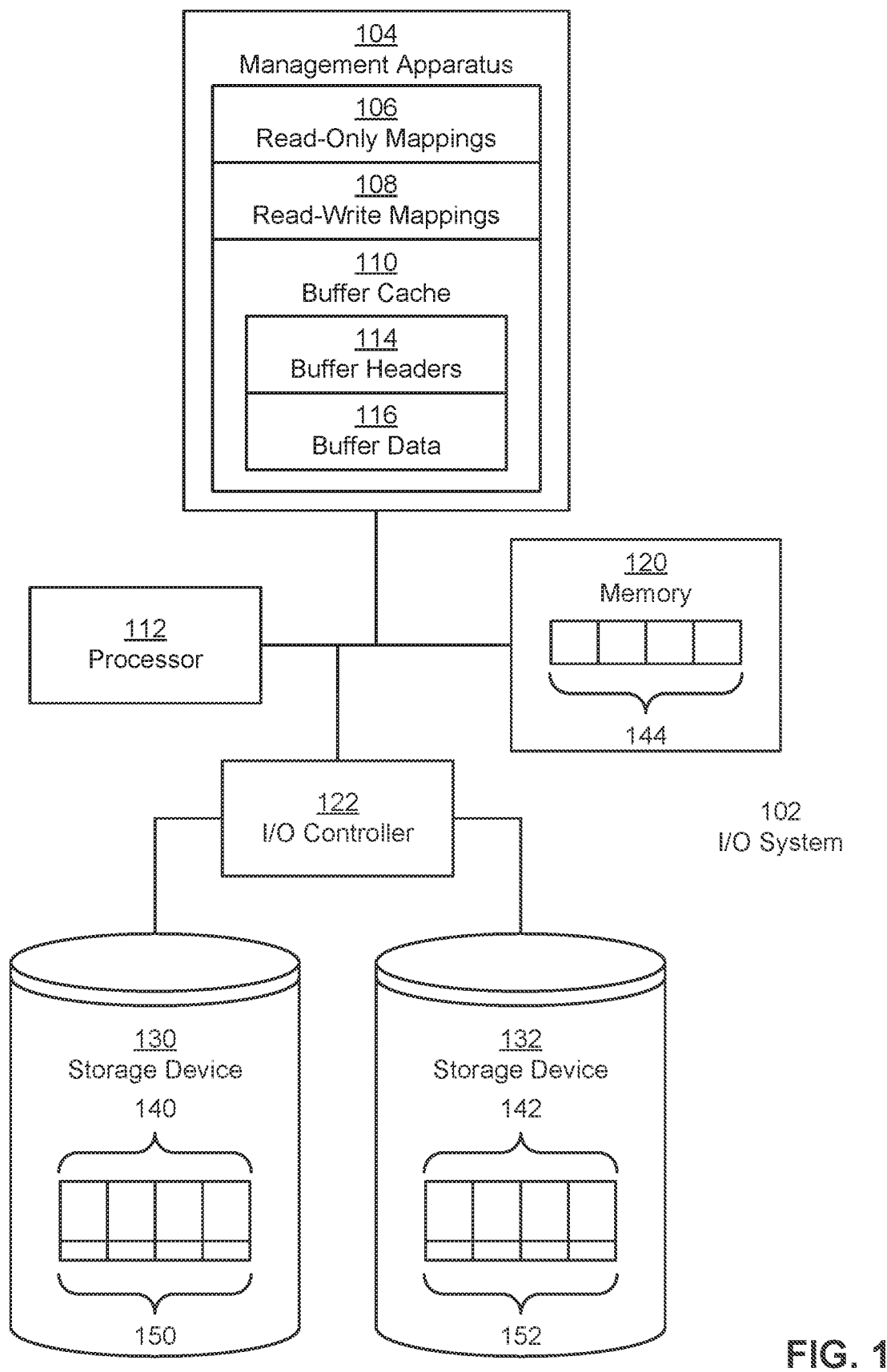
FIG. 1 illustrates a system in accordance with one or more embodiments.

FIG. 1 illustrates a system in accordance with one or more embodiments. As illustrated in FIG. 1, the system includes an input/output (I/O) system 102 that executes on a computer system to perform reads and writes to a data set on a number of physical storage devices 130-132. Storage devices 130-132 may include one or more hard disk drives (HDDs), solid-state drives (SSDs), optical drives, floppy disks, magnetic tape storage, Flash memory, cloud or network storage, and/or other types of physical components or devices for recording and retaining digital data. For example, storage device 130 may store data for the computer system in a set of physical blocks 140, and storage device 132 may store data for the computer system in a different set of physical blocks 142. In turn, the data set stored on storage devices 130-132 may include audio, video, multimedia, documents, databases, files, directories, filesystems, applications, operating systems, virtual machines, and/or other types of digital data used or manipulated by computer systems or electronic devices.

Storage devices 130-132 may be connected to a processor 112 (e.g., a central processing unit (CPU)) and/or main memory 120 on the computer system via an I/O controller 122, which may include a host bus adapter, disk controller, bus, and/or other type of interface between components in the computer system. As a result, I/O system 102 may perform reads and writes to data on storage devices 130-132 by applications and/or threads executing on one or more cores of processor 112. For example, I/O system 102 may execute read and/or write operations as atomic transactions within blocks 144 of memory 120 shared by the applications and/or threads.

One or more components of I/O system 102 may also perform paging, memory management, disk caching, and/or other tasks related to coordinating and streamlining reads and/or writes to blocks 140-142 on storage devices 130-132. For example, a management apparatus 104 executing on processor 112 and/or another component of I/O system 102 may use a buffer cache 110 in memory 120 to store recently accessed data from storage devices 130-132, thereby reducing the amount of disk I/O and associated latency required to read from and write to the data. Within buffer cache 110, management apparatus 104 may maintain a set of buffers, with buffer data 116 in each buffer holding data from a given block and/or other unit of data storage in storage devices 130-132.

In one or more embodiments, I/O system 102 includes functionality to perform transactional, non-lock-based execution of reads and writes to data in storage devices 130-132 using additional metadata that enables fine-grained, block-level conflict detection among concurrently executing read and write transactions. As shown in FIG. 1, the metadata may be physically persisted on storage devices 130-132 using block tags 150-152 for blocks 140-142. For example, storage devices 130-132 may be formatted to include 8-byte T10 data integrity field (DIF) tags for 512-byte disk sectors on storage devices 130-132. As a result, each 4-kilobyte block 140-142 in storage devices 130-132 may span eight sectors and be associated with a 64-byte block tag that spans eight T10 DIF tags for the sectors. In turn, the block tag may store metadata that facilitates concurrent reading and writing of data in the block.

More specifically, each block tag 150-152 may specify a physical and logical identity of the corresponding data block. For example, the block tag may include a physical block number of the block on the corresponding storage device (e.g., storage devices 130-132), as well as a file identifier (e.g., inode) for a file to which the data block belongs and a logical block number representing the offset of the data block within the file. In turn, the physical and logical identity stored in the block tag may be used to provide data integrity protection on storage devices 130-132. For example, the file identifier, logical block number, and/or physical block number stored in the block tag may allow threads, processes, and/or applications in the computer system to detect when the same block has been doubly allocated to two different files.

Metadata in block tags 150-152 may additionally describe the lifecycles of data stored in the corresponding data blocks 140-142. Each block tag may include one or more timestamps that specify a creation time and/or a termination time for the corresponding block. The timestamps may logically track the state of one or more filesystems, virtual disks, volumes, partitions, databases, and/or other mechanisms for organizing and structuring data in blocks 140-142 into files and/or other discrete units. For example, each write transaction with a filesystem accessed using I/O system 102 may be uniquely identified using a commit sequence number (CSN) that is a monotonically increasing integer value representing a logical time at which the write transaction is committed. As write transactions are sequentially committed to the filesystem, the CSN is incremented, and the filesystem's current state may be represented by the highest CSN assigned to the most recently committed write transaction with the filesystem. In turn, a write transaction that successfully commits a set of modifications to one or more blocks 140-142 may increment the CSN and set the creation times of the block(s) to the incremented CSN. The creation times may be stored in representations of block tags for the block(s) in memory 120 for subsequent persisting of the block tags on one or more storage devices 130-132. Consequently, the CSN stored as the logical creation time in a given block tag may track, within the sequence of write transactions committed using I/O system 102, the temporal position of the write transaction used to write data to the corresponding data block.

A management apparatus 104 in I/O system 102 may use metadata in block tags 150-152 and a number of structures in memory 120 to manage concurrent access to data in storage devices 130-132 and/or memory 120. First, management apparatus 104 may maintain a set of read-only mappings 106 and a different set of read-write mappings 108 between virtual addresses and physical addresses in memory 120. Read-only mappings 106 may include mappings between read-only virtual addresses and physical addresses in memory 120, while read-write mappings 108 may include mappings between writable virtual addresses and physical addresses in memory 120. Read-only mappings 106 and read-write mappings 108 may be maintained in a translation lookaside buffer (TLB), page tables, and/or other structures for storing mappings of virtual addresses to physical addresses of pages in memory 120 or slabs of physically contiguous pages in memory 120.

Second, management apparatus 104 may use buffer headers 114 for buffers in buffer cache 110 to store metadata from block tags 150-152 and/or other metadata used to track the lifecycles of data in the corresponding blocks 140-142. As described in further detail below with respect to FIG. 2, metadata in buffer headers 114 may be used with read-only mappings 106 and read-write mappings 108 to manage the use of read-only and writable buffers in memory 120 and detect conflicts during the acquisition, modification, and/or committing of data in the buffers by read and/or write transactions with I/O system 102.

In one or more embodiments, the system may include more or fewer components than the components illustrated in FIG. 1. For example, I/O system 102 may include, execute with, or execute within a logical volume manager, filesystem manager, and/or other components for storing files and/or other types of data on one or more virtual disks, filesystems, partitions, databases, and/or volumes on the computer system. Such components may be local to or remote from each other, implemented in software and/or hardware, and/or distributed over multiple applications and/or machines. Multiple components may also be combined into one application and/or machine. Operations described with respect to one component may instead be performed by another component.

Additional embodiments and/or examples relating to computer networks are described below in Section 6, titled "Computer Networks and Cloud Networks."

In one or more embodiments, a data repository is any type of physical or virtual storage unit and/or device (e.g., a filesystem, database, collection of tables, or any other storage mechanism) for storing data. For example, the data repository may include storage devices 130-132. Further, the data repository may include multiple different storage units and/or devices. The multiple different storage units and/or devices may or may not be of the same type or located at the same physical site. The data repository may be implemented or may execute on the same computing system as I/O system 102 or on a computing system that is separate from I/O system 102. The data repository may be communicatively coupled to I/O system 102 via a direct connection or via a network.

Information describing I/O system 102 may be implemented across any of components within the system. However, this information is illustrated within the data repository 104 for purposes of clarity and explanation.

In one or more embodiments, I/O system 102 refers to hardware and/or software configured to perform operations described herein for managing high-performance writable snapshots. Examples of such operations are described below.

In an embodiment, I/O system 102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Persistent Transactional Memory Metadata-Based Buffer Caches

Figure 2:
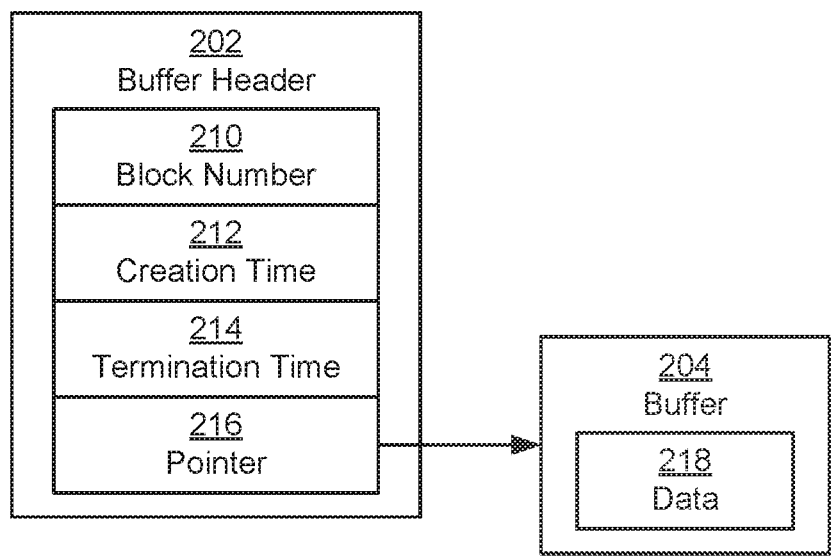
FIG. 2 illustrates an exemplary structure of a buffer cache in an I/O system in accordance with one or more embodiments.

FIG. 2 illustrates an exemplary structure of a buffer cache (e.g., buffer cache 110 of FIG. 1) in an I/O system in accordance with one or more embodiments. As shown in FIG. 2, the buffer cache may include a buffer header 202 for a buffer 204 that stores data 218 from a physical block and/or other unit of data storage on a storage device (e.g., storage devices 130-132 of FIG. 1). For example, buffer 204 may be a page in memory that caches data 218 from the storage device so that subsequent reads and/or writes to the data can be made without performing a high-latency disk I/O operation with the storage device.

To facilitate concurrent access to data 218 in buffer 204, buffer header 202 may store metadata related to the identity and lifecycle of data 218. First, buffer header 202 may include a physical and/or logical block number 210 of data 218 in buffer 204. Second, buffer header 202 may include a creation time 214 and a termination time 214 associated with data 218. As mentioned above, creation time 214 and termination time 214 may be represented as integer-valued CSNs and/or other logical or virtual times that track the ordering of write transactions committed to the I/O system.

Creation time 214 may represent a logical or virtual time at which the current representation of data 218 was created. For example, creation time 214 may represent the time at which data 218 was written to buffer 204 by a write transaction. Creation time 214 may be obtained from a block tag that is or will be persisted with the block on the storage device. Creation time 214 may also be stored in buffer header 202 with or without other fields in the block tag. For example, buffer header 202 may include an 8-byte field containing creation time 212, or buffer header 202 may store the entire 64-byte block tag for the block, which includes the 8-byte field containing creation time 212.

Unlike creation time 212, termination time 214 may be tracked in memory in a field within buffer header 202. Termination time 214 may represent a logical or virtual time at which data 218 has been replaced by a newer version (e.g., during a write operation that modifies data 218), deleted, and/or otherwise invalidated. If data 218 has not been invalidated (i.e., if data 218 is still part of the current state of the I/O system), termination time 214 may be set to a reserved or special value, such as 0.

Finally, buffer header 202 may include a pointer 216 to buffer 204 to enable access to data 218 stored in buffer 204 from buffer header 202. In turn, buffer header 202 may be stored with buffer headers for other buffers in the I/O system in a data structure that facilitates efficient lookup of the buffer headers by one or more keys. For example, the buffer headers may be stored in a hash table. Keys used to insert, access, or delete buffer headers in the hash table may include logical block numbers of blocks cached using the buffers and/or filesystem identifiers of filesystems containing the blocks (to prevent the same logical block number from two or more filesystems from mapping to the same hash table entry).

Figure 3:
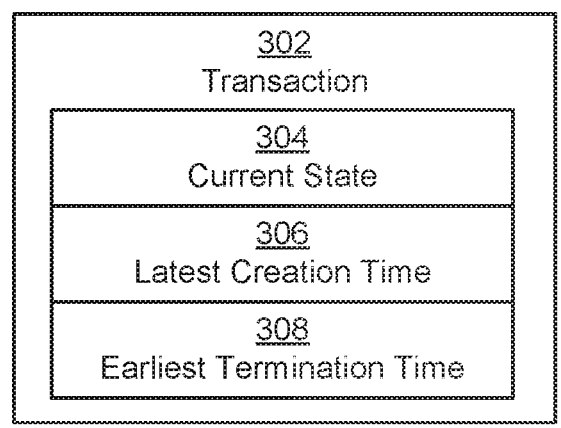
FIG. 3 illustrates an exemplary set of logical times used by a transaction in an input/output (I/O) system in accordance with one or more embodiments.

Block number 210, creation time 212, termination time 214, and/or other metadata from buffer header 202 and/or other parts of the I/O system may be used to detect and remedy conflicts between concurrently executing transactions in the I/O system. As shown in FIG. 3, a transaction 302 may track a current state 304, a latest creation time 306, and an earliest termination time 308 as CSNs and/or other representations of logical time in the I/O system.

Current state 304 may represent the most recent state and/or view of data accessed using the I/O system. For example, current state 304 may be the highest CSN in the I/O system at the time at which transaction 302 was initiated.

Latest creation time 306 may represent the latest point of creation for resources (e.g., buffer, block, etc.) used by transaction 302. For example, latest creation time 306 may be updated as transaction 302 sequentially requests and/or acquires buffers containing blocks of data to be read and/or written by transaction 302. As a result, latest creation time 306 may effectively represent the earliest possible time at which all buffers used by transaction 302 are valid.

Earliest termination time 308 may represent the earliest point at which any resource used by transaction 302 is invalidated. As with latest creation time 306, earliest termination time 308 may be updated as transaction 302 sequentially requests and/or acquires buffers containing blocks of data to be read and/or written. In turn, earliest termination time 308 may represent the latest possible time at which all buffers used by transaction 302 are valid.

For example, transaction 302 may read and/or write to four buffers in the I/O system. The first buffer may include a creation time of 100 and a termination time of 0 (indicating that the buffer is still part of current state 304). The second buffer may include a creation time of 102 and a termination time of 0. The third buffer may include a creation time of 200 and a termination time of 0. The fourth buffer may include a creation time of 150 and a termination time of 205. After all four resources have been acquired by transaction 302, latest creation time 306 may be set to 200, and earliest termination time 308 may be set to 205. In turn, all four resources may be valid or consistent within states of the I/O system spanned by the logical times of 200 to 205.

Figure 4:
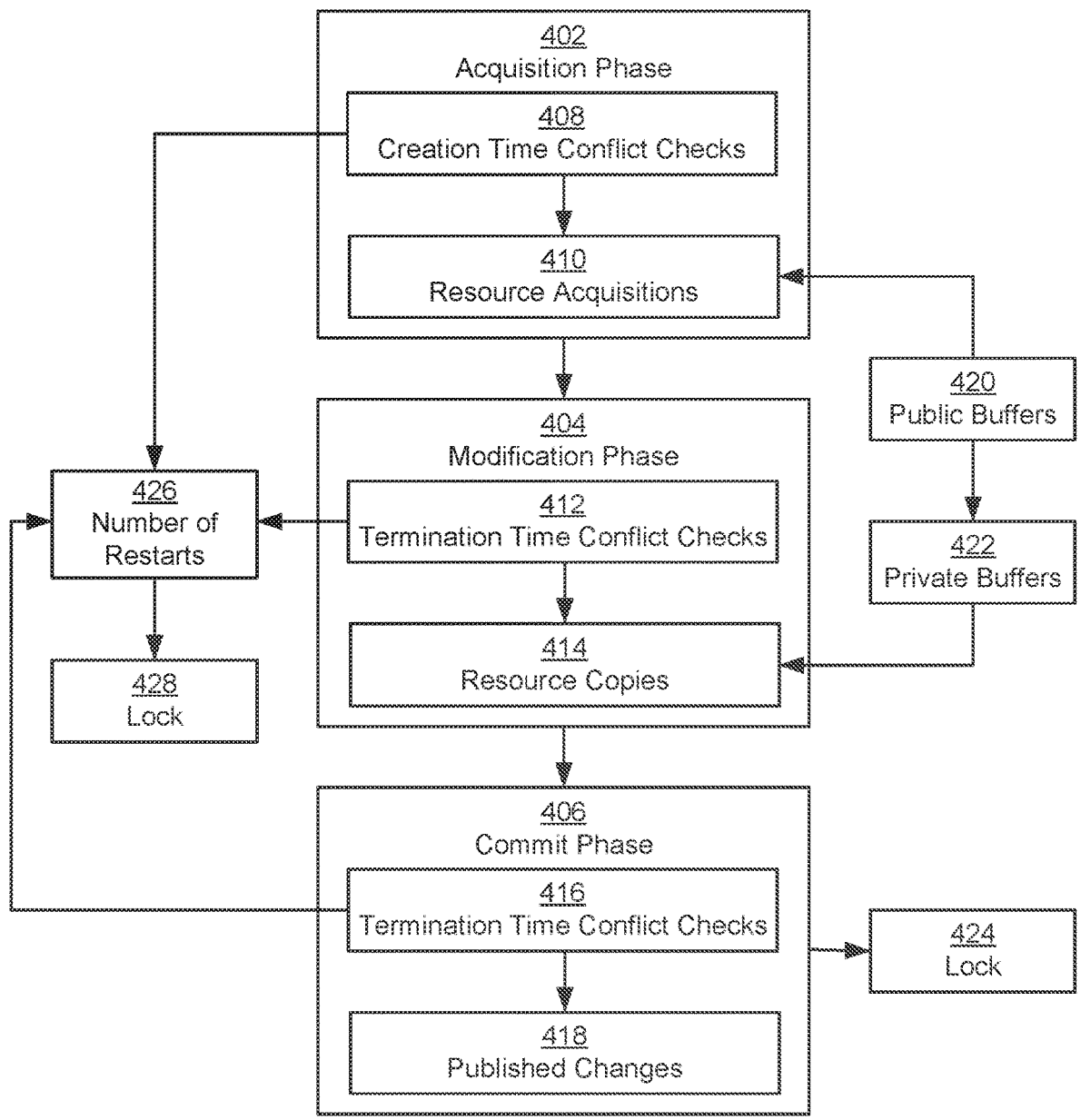
FIG. 4 illustrates a set of execution phases used by a transaction in an I/O system in accordance with one or more embodiments.

Logical times tracked by transaction 302 may then be used during various phases of execution of transaction 302 to detect conflicts and/or perform tasks associated with transaction 302. As shown in FIG. 4, each transaction (e.g., transaction 302 of FIG. 3) may begin with an acquisition phase 402, in which creation time conflict checks 408 are made prior to or during resource acquisitions 410 by the transaction. During acquisition phase 402, the transaction may sequentially request public buffers 420 containing data to be read and/or modified by the transaction. Public buffers 420 may be read-only buffers that cache data from blocks in one or more storage devices accessed using the I/O system. As a result, public buffers 420 may be accessed using a set of read-only mappings (e.g., read-only mappings 106 of FIG. 1) maintained by a management component (e.g., management apparatus 104 of FIG. 1) in the I/O system.

To request a resource, the transaction may provide one or more logical block numbers and/or other unique identifiers for the resource. The transaction and/or management component match the unique identifiers to a buffer header for a public buffer that caches the resource. The transaction and/or management component may then use a pointer in the buffer header and/or the read-only mappings to locate a public buffer containing an up-to-date version of the resource (e.g., a version of the resource that is part of the current state of the I/O system). If the resource is not found in memory, the management component may trigger and/or perform a disk I/O operation that retrieves the resource from a storage device, caches the resource in a new in-memory public buffer, and updates the read-only mappings with the virtual and physical addresses of the new public buffer.

For each newly requested resource, creation time conflict checks 408 may compare the creation time of the resource with the latest creation time (e.g., latest creation time 306 of FIG. 3) of previously acquired resources for the transaction. If the creation time of the resource does not exceed the latest creation time from the previously acquired resources, the resource may pass the conflict check, since the resource is part of the current state of the I/O system at the time of the resource's acquisition and has a lifespan that overlaps with the lifespans of the previously acquired resources.

If the creation time of the resource exceeds the latest creation time from the previously acquired resources, the transaction may compare the creation time of the resource with the earliest termination time (e.g., earliest termination time 308) from the previously acquired resources. If the creation time of the resource does not exceed the earliest termination time from the previously acquired resources, the resource's lifespan may overlap with the lifespans of the previously acquired resources, and no conflict may be found. In turn, the latest creation time of the previously acquired resources may be updated with the creation time of the resource.

If the creation time of the resource exceeds the earliest termination time of the previously acquired resources, the resource's lifespan may fail to overlap with the lifespans of the previously acquired resources (e.g., because a previously acquired resource was invalidated before the creation time of the resource). As a result, a conflict and/or inconsistency between the resource and the previously acquired resources may be found (e.g., because the resource does not coexist with the previously acquired resources in a current or previous state of the I/O system). If a conflict is found during creation time conflict checks 408, an error code may be returned, and a restart of the transaction may be triggered (e.g., to acquire newer versions of the resources that are consistent with one another).

Creation time conflict checks 408 may also include comparing the creation time of the resource with the current state of the I/O system. If the creation time of the resource is greater than the current state of the I/O system, the resource may be committed during an "in-flight" write transaction that has yet to complete and update the current state of the I/O system to reflect the creation time of the resource. Because the resource may conflict with the previously acquired resources, the transaction may be restarted and/or paused to allow the write transaction to complete and the I/O system to reach a consistent state.

If the transaction is a read transaction, the transaction may generate a read result from resource acquisitions 410 after creation time conflict checks 408 have been performed for all acquired resources and exit at the end of acquisition phase 402. If the transaction is a write transaction, the transaction may enter a modification phase 404 that performs a series of termination time conflict checks 412 before resource copies 414 of the acquired resources are made for modification by the transaction.

During modification phase 404, termination time conflict checks 412 may verify that the termination time of each resource (e.g., public buffers 420) acquired in acquisition phase 402 does not precede the current state of the I/O system. In other words, termination time conflict checks 412 may be performed to ensure that all resources acquired by the transaction during acquisition phase 402 are still a part of the latest view of data in the I/O system, and thus contain up-to-date data that can be modified by the transaction. Any resource acquired in acquisition phase 402 with a termination time that precedes the current state of the I/O system may reflect an invalidation of the resource by a concurrent write transaction between the acquisition time of the resource in acquisition phase 402 and a termination time conflict check for the resource in modification phase 404. Because the resource has been invalidated, a conflict may be found, and a restart of the transaction may be triggered.

If a resource passes termination time conflict checks 412 in modification phase 404, a copy of the resource (e.g., resource copies 414) may be produced for modification by the transaction. For example, resources that pass termination time conflict checks 412 may be copied from read-only public buffers 420 to writable private buffers 422. After a given resource is copied into a private buffer, a set of read-write mappings (e.g., read-write mappings 108 of FIG. 1) may be updated to include the virtual and physical addresses of the private buffer.

After termination time conflict checks 412 and resource copies 414 have been made for all resources acquired by the transaction, the transaction may enter a commit phase 406, in which the transaction is ready to commit or publish modifications to the resources that are stored in the corresponding private buffers 422. At the beginning of commit phase 406, the transaction may obtain a lock 424 on commits to the I/O system. During lock 424, other write transactions may be prohibited from committing or publishing their modifications to the I/O system. Conversely, if another write transaction currently has a lock with the I/O system, the transaction may wait until the other transaction has released its lock before obtaining lock 424.

Next, the transaction may perform another set of termination time conflict checks 416 with resources acquired by the transaction. As with termination time conflict checks 412, termination time conflict checks 416 may verify that all resources (e.g., public buffers 420) acquired by the transaction have termination times that do not precede the current state of the I/O system. A resource acquired by the transaction with a termination time that precedes the current state of the I/O system may reflect an invalidation of the resource by a concurrent write transaction between copying of the resource to a private buffer in modification phase 404 and obtaining lock 424 at the start of commit phase 406. If any invalidated resources are found by termination time conflict checks 416, a conflict in the resources may be found, and a restart of the transaction may be triggered. Termination time conflict checks 416 may be performed on resources that have been modified by the transaction, as well as resources that have been acquired by the transaction but not modified by the transaction (e.g., because modifications made by the transaction may depend on data in those resources).

After all resources have passed termination time conflict checks 416, the transaction may generate published changes 418 to the resources. First, the transaction may invalidate old versions of the resources in the I/O system. For example, the transaction may set the termination time of every read-only public buffer modified by the transaction to a logical time representing the current state of the I/O system.

Next, the transaction may replace the old versions with new versions containing changes to the resources made by the transaction. Continuing with the previous example, the transaction may convert all writable private buffers 422 containing changes made by the transaction to the corresponding resources into read-only public buffers by changing the virtual addresses of the buffers from writable to read-only. In turn, the transaction and/or management component may allow other transactions to access the buffers by updating a TLB and/or one or more page tables with mappings of the read-only virtual addresses to the physical addresses of the buffers. The transaction may additionally set the creation time of the new public buffers to a logical time that is after the time at which the transaction was initiated (e.g., a CSN that is one higher than the CSN of the I/O system at the time of initiation of the transaction).

Finally, the transaction may update the current state of the I/O system to reflect the new versions of the resources. For example, the transaction may update the current state of the I/O system to the same value as the creation time of the newly published resources. The transaction may then conclude commit phase 406 by releasing lock 424, thereby allowing other transactions to make subsequent modifications to data in the I/O system.

To guarantee completion of the transaction, the transaction, management component, and/or another component of the I/O system may track a number of restarts 426 resulting from creation time conflict checks 408, termination time conflict checks 412, and/or termination time conflict checks 416. If number of restarts 426 exceeds a threshold, the transaction may obtain a lock 428 for the duration of the transaction to ensure successful completion of the transaction. For example, the transaction may acquire lock 428 after the transaction has restarted more than a threshold of 50 times. The threshold may also be adjusted and/or tuned based on attributes such as the average number of transaction restarts, the priority of the transaction, and/or a policy associated with concurrency control in the I/O system.

The execution phases of FIG. 4 may additionally facilitate efficient snapshotting of data in the I/O system. For example, a transaction that generates a snapshot of a filesystem may increment the CSN of the filesystem to indicate that the filesystem is updated using the snapshot. The transaction may also set the creation time of the snapshot to the incremented CSN. As a result, any resource with a creation time that is less than the CSN of the snapshot may belong to the snapshot. To preserve the integrity of data in the snapshot, modifications to the resource after the creation of the snapshot may be made by performing a copy-on-write (COW) of the resource to a different resource (e.g., a new buffer) before the resource is modified.

The creation time of the snapshot may also enable concurrent execution of write transactions with a snapshot transaction. For example, a write transaction that begins before the snapshot transaction may execute concurrently with the snapshot transaction. If the write transaction commits before the snapshot transaction increments the CSN of the I/O system, modifications committed by the write transaction may be included in the snapshot in lieu of the older versions. If the write transaction does not commit before the snapshot transaction increments the CSN of the I/O system, a conflict may be found between resources used by the write transaction and the snapshot transaction, and the write transaction may be restarted.

4. Example Embodiment

A detailed example is described below for purposes of clarity. Components and/or operations described below should be understood as one specific example, which may not be applicable to certain embodiments. Accordingly, components and/or operations described below should not be construed as limiting the scope of any of the claims.

Figure 5:
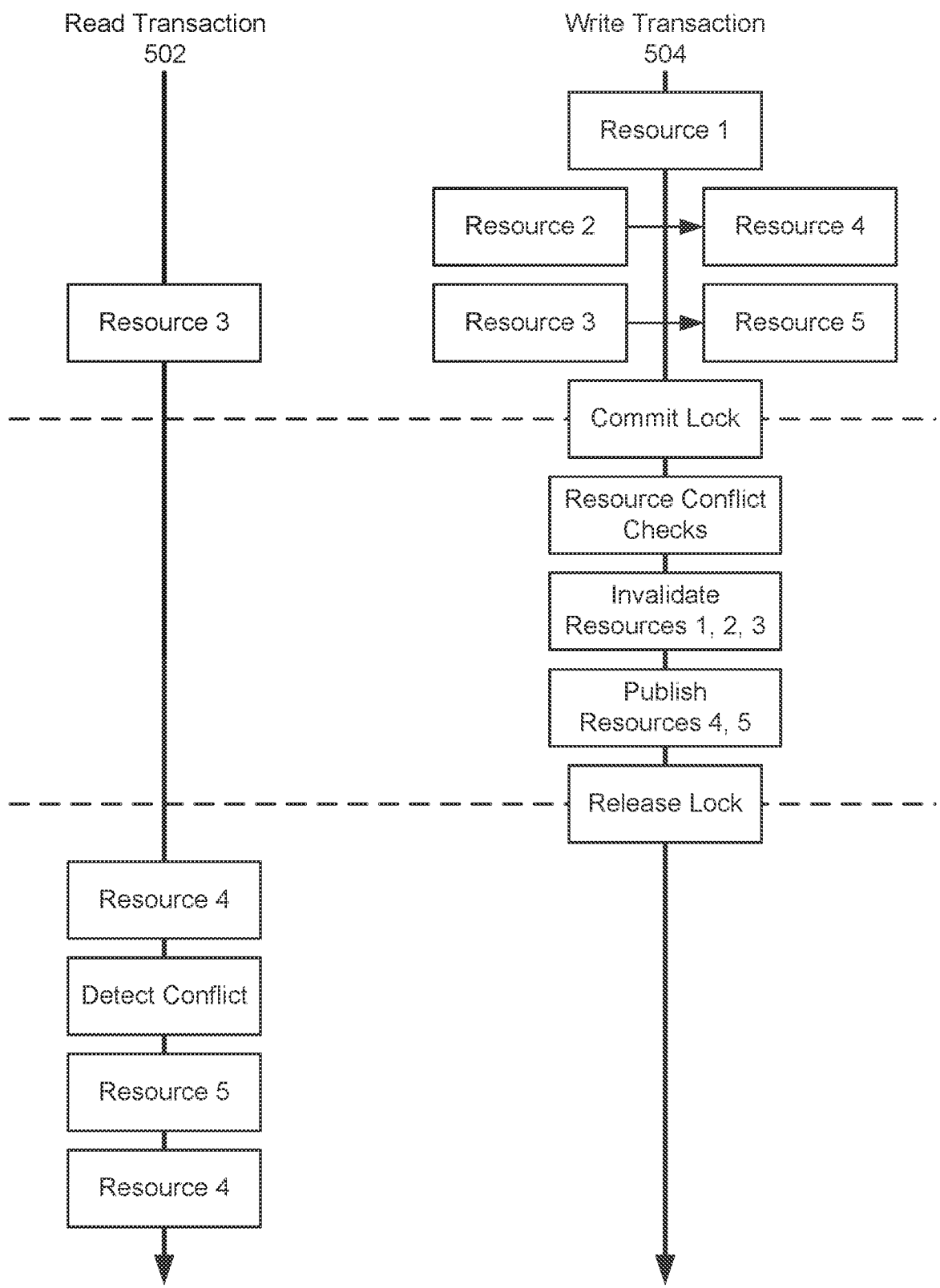
FIG. 5 illustrates an exemplary timeline of operations involved in concurrently executing a read transaction and a write transaction in an I/O system in accordance with one or more embodiments.

FIG. 5 illustrates an exemplary timeline of operations involved in concurrently executing a read transaction 502 and a write transaction 504 in an I/O system in accordance with one or more embodiments. During a pre-commit phase (e.g., acquisition and modification phase) of write transaction 504, write transaction 504 may acquire three resources numbered 1, 2, and 3 and copy resources 2 and 3 to resources 4 and 5, respectively. Prior to acquiring and/or copying the resources, write transaction 504 may perform conflict checks that verify that the resources are consistent with one another and the current state of the I/O system. Read transaction 502 may execute concurrently with write transaction 504 and acquire resource 3 during the pre-commit phase of write transaction 504.

After write transaction 504 has made modifications to resources 2 and 3 using resources 4 and 5, write transaction 504 may enter a commit phase. At the start of the commit phase, write transaction 504 may obtain a commit lock that prevents other transactions from modifying resources on the I/O system. Next, write transaction 504 may perform resource conflict checks that verify that resources 1, 2, and 3 acquired by write transaction 504 are still consistent with one another and the current state of the I/O system. After the resources pass the conflict checks, write transaction 504 may invalidate resources 1, 2, and 3 and publish resources 4 and 5. For example, write transaction 504 may update the termination times of resources 1, 2, and 3 with a CSN of 199 and the creation times of resources 4 and 5 with a CSN of 200. Write transaction 504 may then update the global state of the I/O system to reflect the creation times of resources 4 and 5 (e.g., by setting the global state to the same CSN as the creation times of resources 4 and 5). Finally, write transaction 504 may release the commit lock to complete execution.

After the lock is released by write transaction 504, read transaction 502 may acquire resource 4 as a newer version of resource 2. Read transaction 502 may then detect a conflict between resources 2 and 4 because resource 4 was created after resource 2 was invalidated. In response to the detected conflict, read transaction 502 may restart. After the restart, read transaction 502 may acquire resources 5 and 4 as newer versions of resources 3 and 2, respectively. Because resources 4 and 5 are consistent with one another, read transaction 502 may successfully complete after the restart.

Figure 6:
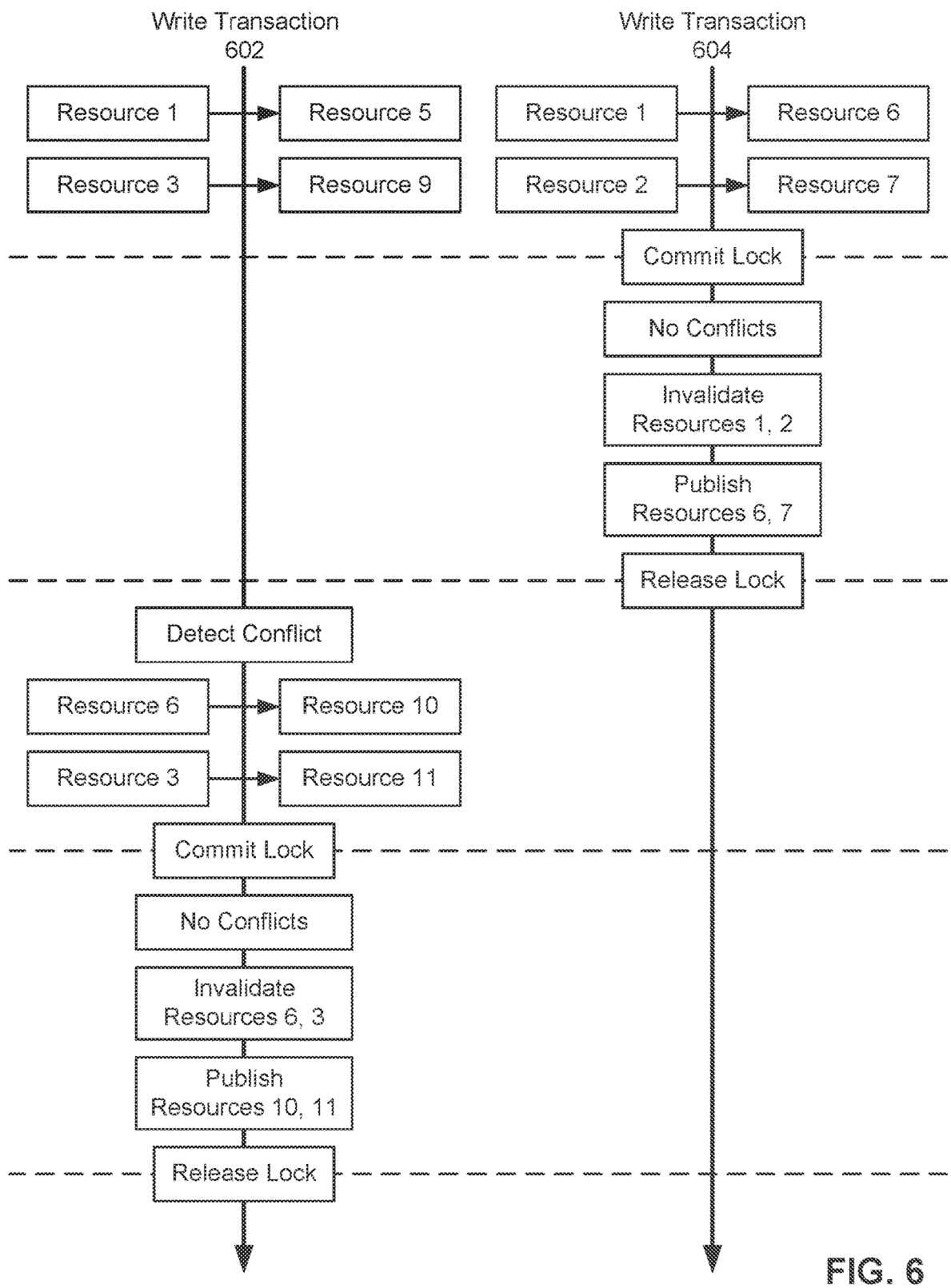
FIG. 6 illustrates an exemplary timeline of operations involved in concurrently executing two write transactions in an I/O system in accordance with one or more embodiments.

FIG. 6 illustrates an exemplary timeline of operations involved in concurrently executing two write transactions 602-604 in an I/O system in accordance with one or more embodiments. At the start of the timeline, both write transactions 602-604 may be in a pre-commit phase of acquiring and copying resources for modification. In the pre-commit phase, write transaction 602 may acquire resources 1 and 3 and copy the resources to resources 5 and 9, respectively. Write transaction 604 may concurrently acquire resources 1 and 2 and copy the resources to resources 6 and 7, respectively. Both write transactions 602-604 may perform conflict checks prior to acquiring and copying the corresponding resources to ensure that the resources are consistent with the current state of the I/O system.

Next, write transaction 604 may enter a commit phase by obtaining a commit lock. During the commit lock, write transaction 602 and/or other write transactions may be barred from committing modifications to the I/O system. Next, write transaction 604 may perform resource conflict checks that verify that resources 1 and 2 acquired by write transaction 604 are still consistent with one another and the current state of the I/O system. After the resources pass the conflict checks, write transaction 604 may invalidate resources 1 and 2 and publish resources 6 and 7. For example, write transaction 604 may update the termination times of resources 1 and 2 with a CSN of 299 and the creation times of resources 6 and 7 with a CSN of 300. Write transaction 604 may then update the global state of the I/O system to reflect the creation times of resources 6 and 7 (e.g., by setting the global state to the same CSN as the creation times of resources 6 and 7). Finally, write transaction 604 may release the lock to complete execution.

After the lock is released by write transaction 604, write transaction 602 may detect a conflict in acquired resources 1 and 3. For example, write transaction 602 may detect that resource 1 has been invalidated and is thus inconsistent with the current state of the I/O system. As a result, write transaction 602 may restart the pre-commit phase and acquire resource 6 as the new version of resource 1, along with the original resource 3. After verifying that resources 6 and 3 are consistent with one another and the current state of the I/O system, write transaction 602 may copy the resources to resource 10 and 11, respectively.

Once write transaction 602 is ready to commit modifications to resources 6 and 3 made using resources 10 and 11, write transaction 602 may obtain a commit lock on the I/O system. Next, write transaction 602 may perform resource conflict checks that verify that resources 6 and 3 acquired by write transaction 602 are still consistent with one another and the current state of the I/O system. After the resources pass the conflict checks, write transaction 602 may invalidate resources 6 and 3 and publish resources 10 and 11. For example, write transaction 604 may update the termination times of resources 6 and 3 with a CSN of 300 and the creation times of resources 10 and 11 with a CSN of 301. Write transaction 602 may then update the global state of the I/O system to the same CSN of 301. Finally, write transaction 602 may release the commit lock to complete execution.

5. Processing a Read Transaction in an I/O System

Figure 7:
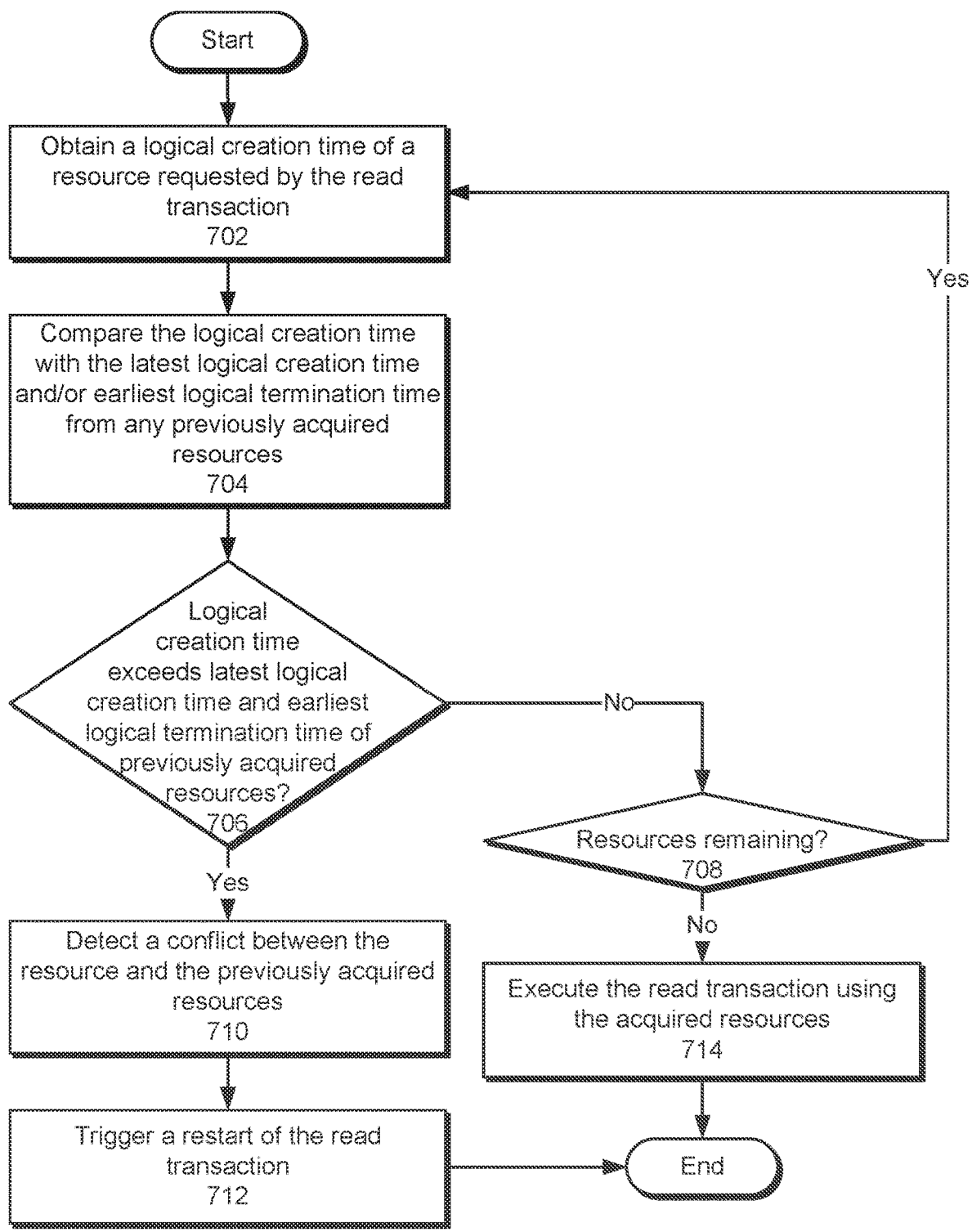
FIG. 7 illustrates a flowchart of executing a read transaction in an I/O system in accordance with one or more embodiments.

FIG. 7 illustrates a flowchart of executing a read transaction in an I/O system in accordance with one or more embodiments. In one or more embodiments, one or more of the steps may be omitted, repeated, and/or performed in a different order. Accordingly, the specific arrangement of steps shown in FIG. 7 should not be construed as limiting the scope of the embodiments.

First, a logical creation time of a resource requested by the read transaction is obtained (operation 702). For example, the logical creation time may be represented using an integer CSN that tracks, within a sequence of write transactions and/or other transactions that commit changes to the I/O system, the temporal position of the write transaction used to create the resource.

The resource may include data on one or more storage devices accessed using the I/O system. For example, the resource may include one or more blocks stored on an HDD, SDD, network drive, and/or other physical storage coupled to the I/O system. The logical creation time may be obtained from a block tag and/or other metadata persisted with the resource. The logical creation time may also, or instead, be obtained from an in-memory representation of the metadata, such as a buffer header for an in-memory buffer that caches data from the block to reduce the frequency of high-latency disk I/O operations to the storage devices.

Next, the logical creation time is compared with the latest logical creation time and/or earliest logical termination time from any previously acquired resources (operation 704) for the transaction to determine if the logical creation time exceeds both the latest logical creation time and earliest logical termination time of the previously acquired resources (operation 706). For example, the logical creation time may initially be compared with the latest logical creation time from the previously acquired resources. If the logical creation time exceeds the latest logical creation time of the previously acquired resources, the logical creation time may be compared with the earliest logical termination time from the previously acquired resources. If the logical creation time also exceeds the earliest logical termination time of the previously acquired resources, the resource may fail to overlap with the previously acquired resources in any current or past state of the I/O system. In turn, a conflict between the resource and the previously acquired resources is detected (operation 710), and a restart of the read transaction is triggered (operation 712).

Operations 702-706 may be repeated for remaining resources (operation 708) to be acquired by the transaction, as long as each newly acquired resource passes the conflict check in operation 706. After all resources have been acquired and the consistency of the resources with one another and/or the current state of the I/O system has been verified, the read transaction is executed using the acquired resources (operation 714). For example, the read transaction may return some or all of the data in the resources for use by an application, operating system, and/or other component that uses the I/O system to read and/or write data on the storage devices.

6. Processing a Write Transaction in an I/O System

Figure 8:
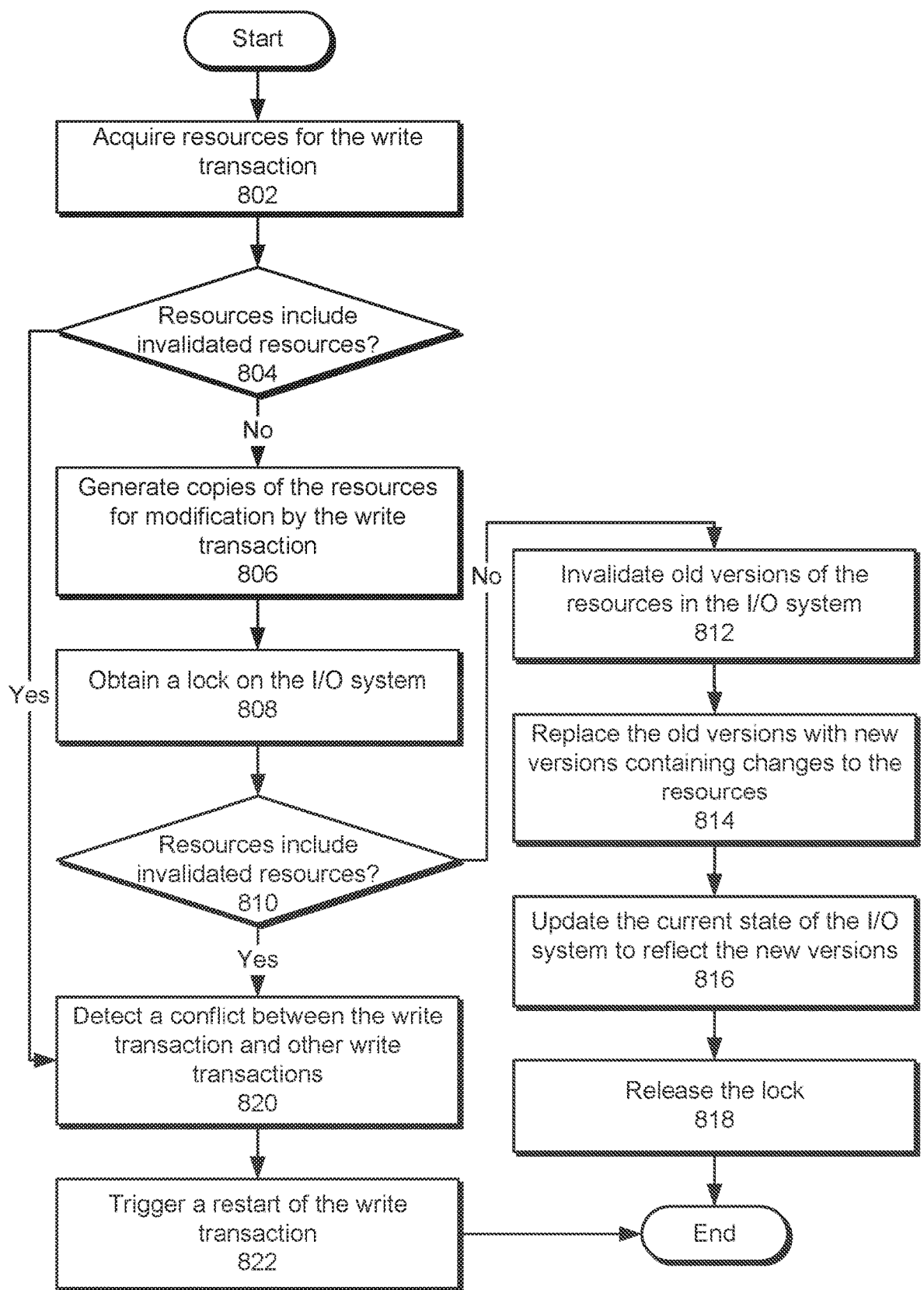
FIG. 8 illustrates a flowchart of executing a write transaction in an I/O system in accordance with one or more embodiments.

FIG. 8 illustrates a flowchart of executing a write transaction in an I/O system in accordance with one or more embodiments. In one or more embodiments, one or more of the steps may be omitted, repeated, and/or performed in a different order. Accordingly, the specific arrangement of steps shown in FIG. 8 should not be construed as limiting the scope of the embodiments.

Initially, resources for the write transaction are acquired (operation 802). Such acquisition may be performed using operations 702-712 of FIG. 7, or the resources may be acquired without performing conflict checks involving the creation times of the resources. Next, the resources may be examined for invalidated resources (operation 804). For example, the logical termination times of the resources may be compared with the current state of the I/O system. If any of the logical termination times precedes the logical time representing the current state of the I/O system, the resources may include invalidated resources.

If any invalided resources are found in operation 804, a conflict is detected between the write transaction and other write transactions (operation 820) in the I/O system. For example, detection of an invalidated resource in operation 804 may indicate that another concurrent write transaction has committed a modification to the resource in the time between acquisition of the resource in operation 802 and the conflict check of the resource in operation 804. In turn, a restart of the write transaction is triggered (operation 822) to allow the write transaction to obtain newer versions of the resources that are consistent with one another and/or the current state of the I/O system.

If no invalidated resources are found in operation 804, copies of the resources are generated for modification by the write transaction (operation 806). For example, the resources may be acquired as read-only, in-memory public buffers that cache data in storage devices accessed using the I/O system. After the public buffers pass the conflict check in operation 804, data in the public buffers may be copied to writable, in-memory private buffers that can be accessed only by the write transaction. In turn, the write transaction may use the private buffers to make modifications to the resources.

When the write transaction is ready to commit the modifications, the write transaction may transition from a pre-commit phase to a commit phase of execution in the I/O system. At the start of the commit phase, the write transaction obtains a lock on the I/O system (operation 808) to prevent other write transactions from concurrently committing their modifications to the same or different resources.

Next, the write transaction performs an additional conflict check that examines the resources for invalidated resources (operation 810). An invalidated resource found in operation 810 may indicate that another concurrent write transaction has committed a modification to the resource in the time between copying the resource in operation 806 and checking the resource for conflicts in operation 810. In turn, a restart of the write transaction is triggered (operation 822) to allow the write transaction to obtain newer versions of the resources that are consistent with one another and/or the current state of the I/O system.

If no invalidated resources are found in operation 810, the write transaction may proceed with publishing changes to the resources. In particular, the write transaction invalidates old versions of the resources in the I/O system (operation 812) and replaces the old versions with new versions containing the changes to the resources (operation 814). For example, the write transaction may set the logical termination time of public buffers containing the old versions to a logical time representing the current state of the I/O system. The write transaction may also set the logical creation times of private buffers containing the new versions to a later logical time than the logical termination time of the old versions. The write transaction and/or another component of the system may further change the private buffers into read-only public buffers by converting the virtual addresses of the buffers from writable private addresses to read-only public addresses.

The write transaction then updates the current state of the I/O system to reflect the new versions (operation 816). Continuing with the previous example, the write transaction may set the current state of the I/O system to a logical time that is the same as the creation time of the published changes. By incrementing the current state of the I/O system, the write transaction may invalidate the public buffers with logical termination times that precede the current state. The invalidated public buffers may subsequently be freed to enable use of memory occupied by the public buffers with other data. Finally, the write transaction may complete execution by releasing the lock (operation 818).

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread). A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application-programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 9:
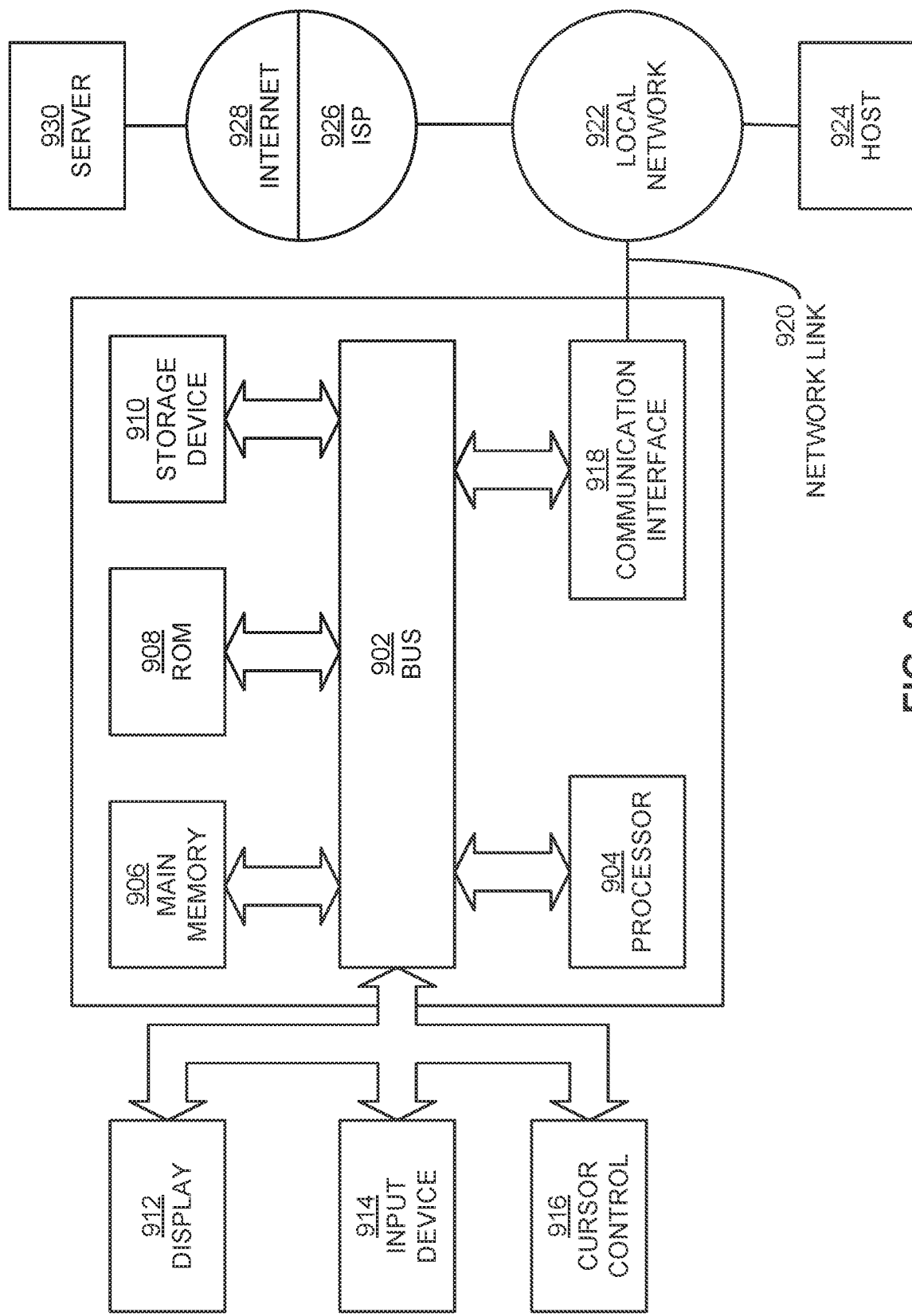
FIG. 9 shows a block diagram that illustrates a computer system in accordance with one or more embodiments.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   during a pre-commit phase of a first transaction that performs a write to an input/output (I/O) system, verifying that a first set of resources acquired by the first transaction do not have logical termination times that precede a current state of the I/O system as defined by committed transactions across resources, including the first set of resources, associated with the I/O system;
   generating copies of the first set of resources for modification by the first transaction;
   responsive at least to successfully verifying during the pre-commit phase of the first transaction, executing a commit phase of the first transaction;
   obtaining a lock on the I/O system at a start of the commit phase of the first transaction; and
   during the commit phase of the first transaction, verifying that the logical termination times of the first set of resources do not precede the current state of the I/O system before publishing one or more modifications to the first set of resources to the I/O system.

2. The medium of claim 1, wherein the operations further comprise:
   during a pre-commit phase of a second transaction with the I/O system, obtaining a first logical creation time of a first resource to be acquired by the second transaction;
   when the first logical creation time exceeds a latest logical creation time from a second set of resources previously acquired by the second transaction, comparing the first logical creation time of the first resource with an earliest logical termination time from the second set of resources; and
   when the first logical creation time of the first resource exceeds the earliest logical termination time from the second set of resources, detecting a conflict between the first resource and the second set of resources and triggering a restart of the second transaction.

3. The medium of claim 2, wherein the operations further comprise:
   tracking a number of restarts of the second transaction; and
   when the number exceeds a threshold, holding the lock on the I/O system for a duration of the second transaction.

4. The medium of claim 1, wherein the operations further comprise:

during the pre-commit phase of the first transaction, verifying that a first logical creation time of a first resource to be acquired by the second transaction does not exceed the current state of the filesystem.

5. The medium of claim 1, wherein the operations further comprise:
during the pre-commit phase of the first transaction, verifying that a first logical creation time of a first resource to be acquired by the first transaction does not exceed an earliest logical termination time of resources previously acquired by the first transaction.

6. The medium of claim 1, wherein the operations further comprise:
during generation of a snapshot of the I/O system, incrementing a logical time representing the current state of the I/O system; and
setting a creation time of the snapshot to the incremented logical time.

7. The medium of claim 6, wherein the operations further comprise:
after the snapshot is created, performing a copy-on-write (COW) of a resource with a creation time that is less than the creation time of the snapshot prior to modifying the resource.

8. The medium of claim 1, wherein publishing the changes to the first set of resources to the I/O system comprises:
invalidating old versions of the first set of resources in the I/O system; and
replacing the old versions with new versions of the first set of resources, wherein the new versions comprise the changes to the first set of resources.

9. The medium of claim 8, wherein invalidating the old versions of the resources comprises:
setting a logical termination time of the old versions to a first logical time representing the current state of the I/O system.

10. The medium of claim 8, wherein replacing the old versions with the new versions of the resources comprises:
setting a logical creation time of the new versions to a second logical time that is later than the first logical time.

11. The medium of claim 8, wherein publishing the changes to the resources to the I/O system further comprises:
updating the current state of the I/O system to reflect the new versions.

12. The medium of claim 1, wherein generating the copies of the first set of resources for modification by the first transaction comprises:
copying public read-only versions of the first set of resources to private writable versions of the first set of resources.

13. The medium of claim 1, wherein the first set of resources comprises an in-memory buffer in the I/O system.

14. The medium of claim 1, wherein the logical termination times are obtained from block tags for physical blocks storing the first set of resources.

15. A method, comprising:
during a pre-commit phase of a first transaction that performs a write to an input/output (I/O) system, verifying that a first set of resources acquired by the first transaction do not have logical termination times that precede a current state of the I/O system as defined by committed transactions across resources, including the first set of resources, associated with the I/O system;
generating copies of the first set of resources for modification by the first transaction;
responsive at least to successfully verifying durinq the pre-commit phase of the first transaction, executing a commit phase of the first transaction;
obtaining a lock on the I/O system at a start of the commit phase of the first transaction; and
during the commit phase of the first transaction, verifying that the logical termination times of the first set of resources do not precede the current state of the I/O system before publishing one or more modifications to the first set of resources to the I/O system;
wherein the method is executed by at least one device including a hardware processor.

16. The method of claim 15, further comprising:
during a pre-commit phase of a second transaction with the I/O system, obtaining a first logical creation time of a first resource to be acquired by the second transaction;
when the first logical creation time exceeds a latest logical creation time from a second set of resources previously acquired by the second transaction, comparing the first logical creation time of the first resource with an earliest logical termination time from the second set of resources; and
when the first logical creation time of the first resource exceeds the earliest logical termination time from the second set of resources, detecting a conflict between the first resource and the second set of resources and triggering a restart of the second transaction.

17. The method of claim 16, further comprising:
tracking a number of restarts of the second transaction; and
when the number exceeds a threshold, holding the lock on the I/O system for a duration of the second transaction.

18. The method of claim 15, wherein publishing the changes to the resources to the I/O system comprises:
invalidating old versions of the resources in the I/O system;
replacing the old versions with new versions of the resources, wherein the new versions comprise the changes to the resources; and
updating the current state of the I/O system to reflect the new versions.

19. The method of claim 15, wherein:
invalidating the old versions of the resources comprises setting a logical termination time of the old versions to a first logical time representing the current state of the I/O system, and
replacing the old versions with the new versions of the resources comprises setting a logical creation time of the new versions to a second logical time that is later than the first logical time.

20. An apparatus, comprising:
one or more processors; and
memory storing instructions that, when executed by the one or more processors, cause the apparatus to:
during a pre-commit phase of a first transaction that performs a write to an input/output (I/O) system, verifying that a first set of resources acquired by the first transaction do not have logical termination times that precede a current state of the I/O system as defined by committed transactions across resources, including the first set of resources, associated with the I/O system;
generating copies of the first set of resources for modification by the first transaction;
responsive at least to successfully verifying during the pre-commit phase of the first transaction, executing a commit phase of the first transaction;

obtaining a lock on the I/O system at a start of the commit phase of the first transaction; and during the commit phase of the first transaction, verifying that the logical termination times of the first set of resources do not precede the current state of the I/O system before publishing one or more modifications to the first set of resources to the I/O system.

* * * * *